United States Patent [19]

Litzberg

[11] Patent Number: 4,951,738

[45] Date of Patent: Aug. 28, 1990

[54] METHOD AND APPARATUS FOR RECOVERING HEAT ENERGY FROM POLLUTED WATER

[75] Inventor: Lennart Litzberg, Stockholm, Sweden

[73] Assignee: Sical AB, Stockholm, Sweden

[21] Appl. No.: 321,639

[22] Filed: Mar. 9, 1989

[30] Foreign Application Priority Data

Mar. 11, 1988 [SE] Sweden .................................. 8800882

[51] Int. Cl.$^5$ ............................ F28D 7/10; F24H 1/00; F28G 3/04

[52] U.S. Cl. ............................................ 165/1; 165/13; 165/47; 165/94; 165/95

[58] Field of Search ....................... 165/13, 47, 94, 95, 165/32, 96, 909, 1

[56] References Cited

U.S. PATENT DOCUMENTS

| | | | |
|---|---|---|---|
| 4,088,182 | 5/1978 | Basdekas et al. | 165/32 |
| 4,207,752 | 6/1980 | Schwartz | 165/909 |

FOREIGN PATENT DOCUMENTS

| | | | |
|---|---|---|---|
| 7706927 | 8/1978 | Sweden | 165/909 |
| 0950517 | 2/1964 | United Kingdom | 165/96 |

*Primary Examiner*—John Ford
*Attorney, Agent, or Firm*—Cushman, Darby & Cushman

[57] ABSTRACT

A heat exchanger is provided in the form of cylindrical, hollow panels in upstanding, spaced, concentric relationship for a first medium flow, and a casing surrounding the panels for a second medium flow. The upper edges of the panels are mutually level. The heat exchanger also includes a carrying arm rotatable in the horizontal plane above the upper edges of the panels and carrying vertical cleaning arms extending between the panels. The second medium flow is downwardly taken into the casing under the inmost panel, and is taken out downwards from the casing outside the outmost panel the liquid surface of the second medium flow is allowed to rise to a level between the upper edges of the panels and the lower part of the carrying arm. A substantially constant gas volume is maintained in the casing above the liquid surface of the second medium flow, by arranging a control for sensing the liquid level (25) of the second medium flow. A gas pump (25) is arranged to maintain the gas volume in the casing above the liquid level substantially constant in response to the control.

6 Claims, 1 Drawing Sheet

METHOD AND APPARATUS FOR RECOVERING HEAT ENERGY FROM POLLUTED WATER

BACKGROUND OF THE INVENTION

Swedish patent specifications 7706927-6, 7908805-0 and 8105501-4 disclose systems in which the type of heat exchanger intended for use in practicing the present invention is used. These systems are completely open. For the heat exchanger included in such a system to function it is required that the heat exchanger be sunk to a certain proper level in the liquid, consisting of the polluted water or sea/lake water, which surrounds the cylindrical panels in the presence of variable flow. If this is not possible, overflow pipes or water traps must be used to keep the liquid level in the heat exchanger at the proper level. This involves a large disadvantage, since placing and erection of the heat exchanger are thus decided within certain limits, in turn resulting in that large difficulties in the use of available space can occur in fitting the heat exchanger into the system.

By means of the present invention it is possible to place the heat exchanger in such a location that it is suitable in the system, e.g. without regard to the liquid level in an open system.

BRIEF DESCRIPTION OF THE DRAWING

The invention will now be described in more detail in the form of examples and with reference to the accompanying schematic drawing, wherein.

In the drawing

DETAILED DESCRIPTION

Figure 2:
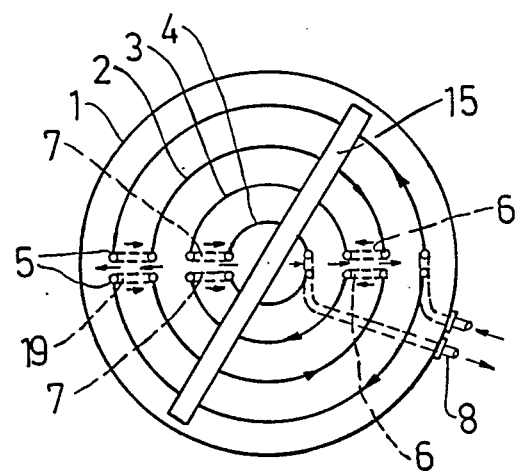
FIG. 2 illustrates the cylindrically shaped heat exchanger panels, which are shown without any further relation to the rest of the heat exchanger.
Figure 1:
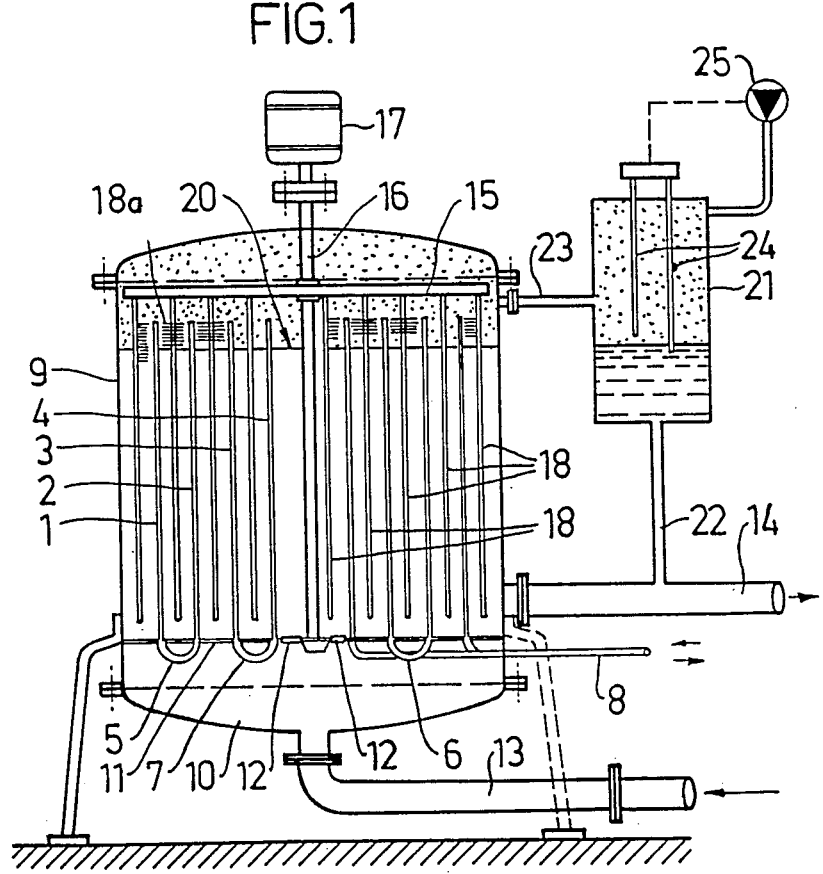
FIG. 1 is a sectional side view of the heat exchanger in accordance with the invention.

In the figures, the numerals 1, 2, 3 and 4 denote the concentrically arranged, hollow, cylindrical panels standing side by side. The panels can be conventionally fabricated from helically extending pipes or two mutually joined pipes. A first fluid flows into the outmost panel 1 and flows from it via pipe bends 5 to the panel 2. From panel 2 the medium flows via pipe bends 6 to panel 3, and from panel 3, the medium flows via pipe bends 7 to the central panel 4. The first fluid leaves panel 4 via an outlet 8. As will be seen from FIG. 2, the first fluid flows connected in parallel from the outside and inwards towards the centre of the heat exchanger.

The heat exchanger in accordance with the invention further comprises a casing 9, upwardly and downwardly closed, and downwardly having a collection chamber 10 bounded by an intermediate wall 11. This wall carries the cylindrical panels 1-4 and is provided with inlet openings 12, which lead to the interior of the central panel 4. A line 13 for polluted or sea/lake water is connected to to the lower end wall of the casing 9. An outlet line 14 is connected to the shell of the casing for this water, and it must be connected below the level 20 of the liquid, as will be described later, and, in the example illustrated, the connection is just above the intermediate wall 11.

The upper end edges of the panels 1-4 are mutually level, and above them is arranged a carrying arm 15 mounted on a shaft 16. The shaft is suitably mounted at its bottom end on the intermediate wall 11, and sealingly mounted upwardly at the upper end wall of the casing 9 in a way not more closely illustrated. The shaft 16 is driven by an electric motor 17. The carrying arm 15 carries vertically extending cleaning arms 18, situated between the panels 1-4. The cleaning arms are suitably provided with brushes (indicated at 18a) for cleaning the surfaces of the panels 1-4 when the carrying arm is rotated by the motor 17.

The polluted or sea/lake water, which comes up through the inlet openings 12, flows from the space within the central panel 4 and outwards through elongate openings 19 in the panels (see FIG. 2). The flow rate through these openings 19, i.e. the residence time of the polluted or sea/lake water between two adjacent panels, is determined by the width of the openings 19 as well as the amount of flow. It is necessary for the function of the heat exchanger that the liquid level in the casing 9 not rise over the upper edges of the panels 1-4. If a flow over the panel edges should occur, there will be an uncontrolled operational sequence and the heat exchanger function will collapse. It is accordingly extremely important that the surface 20 of the polluted or sea/lake water be under the upper edges of the panels 1-4. For optimum function, as large as possible a part of the heat exchanger surfaces shall, of course, be used. The liquid level should, therefore, not be too low, but at a practically constant level just below the edges of the panels. To make this possible, the gas volume above the liquid level 20 for a given heat exchanger should be kept as constant as possible. For this purpose, a vessel 21 is arranged such that its interior is in communication with the polluted or sea/lake water via a line 22, and with the gas volume above the liquid surface via a line 23. The liquid level in this vessel 21 will accordingly, be the same as in the heat exchanger. Upper and lower limits for the liquid level in the vessel 21 are sensed in a suitable manner, e.g. by the schematically illustrated sensing bodies 24. The vessel 21 and sensing bodies 24 may be said to form a control means, which, by signals responsive to values sensed by the bodies 24, control the operation of a gas pump or compressor 25. If the liquid in the vessel 21 and thus in the heat exchanger rises above a given, sensed value, the gas pump is caused to supply gas, e.g. air, to the space above the liquid surface, which is thus kept down, and the volume above the surface is kept practially constant. If the liquid surface 20 falls below a given, sensed level gas is vented from the space above the liquid surface via the gas pump or via an unillustrated valve. In the case wherein there is a sub-pressure in the system in which the heat exchanger operates, the gas pump evacuates gas from the space above the liquid surface when this surface falls below a given level. Gas is let into the space via the pump 25, or via an unillustrated valve, should the surface rise above a given level, in this way keeping the space above the liquid surface practically constant.

It is of course possible for one skilled in the art to vary, within the scope of the invention, the details included in the invention which have been shown and described herein.

I claim:

1. Apparatus for recovering heat energy from a body of polluted water, comprising:
    a plurality of coaxially arranged, mutually radially-spaced upright generally cylindrically-curved hollow panel means arranged in a series so that one panel means is radially innermost and another is radially outermost, each relatively radially outer said panel means surrounding a respectively next radially inner said panel means; said panel means all having axially upper edges disposed at a first, common level; each said panel means being hollow and defined by radially inner and outer walls defining an enclosed space; each panel means having at least one inlet and at least one outlet;

a heat exchange fluid inlet conduit connected with each inlet of one of said panel means;

a heat exchange fluid outlet conduit connected with each outlet of another of said panel means;

at least one further fluid conduit serially connecting each radially outer said panel means with a respective next radially inner said panel means, whereby, in use, heat exchange fluid introduced through said inlet flows successively through each said panel means and out of said outlet;

a casing fully enclosing said plurality of panel means;

an inlet to said casing for introducing a flow of polluted water from a body of polluted water into said casing into externally bathing heat exchange relationship with said panel means;

an outlet from said casing for collecting from said casing said flow of said polluted water after said flow of polluted water has passed, in use, in externally bathing heat exchange relationship with said panel means and thereby given-up heat to the heat exchange fluid flowing in said panel means;

partition and aperture means provided in said casing and panel means for directing said flow of polluted water, in use, to flow serially in externally bathing relationship to said panel means between said inlet and outlet of said casing;

said casing adapted to remain, in use, partly filled with said flow of polluted water, so that said flow of polluted water has an upper level in said casing, above which said casing has an enclosed headspace;

a polluted water flow sensing and control means including:
 means for sensing the vertical position of said upper level in relation to a permissible horizontal band located adjacent but below said first, common level of said upper edges of said panel means, and
 means for pressurizing said headspace in response to a signal provided by said sensing means that said upper level has reached the upper extent of said horizontal band, for preventing said flow of polluted water, in use, from flowing over said upper edges of said panel means;

a generally-horizontal carrying arm disposed in said casing above said upper edges of said panel means;

means mounting said arm for rotation about a substantially vertical axis that is coaxial with said panel means; and cleaning brush means mounted to said arm and depending into cleaning relationship with radially inner and outer surfaces of said panel means.

2. The apparatus of claim 1, wherein:

each said panel means comprises two approximately semi-cylindrical hollow panels collectively arranged in cylindrical form;

said aperture means being defined at least in part between adjacent ends of respective panels of each panel means.

3. The apparatus of claim 2, wherein:

each inlet of said one panel means communicates with the adjacent ends of both panels of the radially outermost of said panel means;

each outlet of said other panel means communicates with the adjacent ends of both panels of the radially innermost of said panel means; and each said further fluid conduit communicates respective adjacent ends of both panels of a respective radially outer said panel means with respective adjacent ends of both panels of a respective next radially inner said panel means.

4. The apparatus of claim 3, wherein:

said inlet to and outlet from said casing and said partition and aperture means are positioned to pass said flow of polluted water, in use, in indirect countercurrent heat exchange relationship with said heat exchange fluid.

5. The apparatus of claim 4, wherein:

said inlet to said casing is located below said panel means and said outlet from said casing is located radially outwardly of said radially outermost panel means.

6. A method for recovering heat energy from a body of polluted water, comprising:

(a) providing a closed casing housing a series of radially spaced, coaxially arranged upright, generally cylindrical hollow panels having upper edges set at a common level;

(b) causing a stream of heat exchange fluid which is to be heated to flow into a first, radially outermost one of said panels, serially through each of said panels and out of a last, radially innermost one of said panels;

(c) causing a stream of polluted water from a body of polluted water to flow into said casing, serially in externally bathing relationship with each of said panels, radially innermost first and out of said casing radially outwardly of the radially outermost one of said panels;

(d) while conducting steps (b) and (c), sensing the upper level of said polluted water in said casing, providing a signal corresponding to excess and deficiency in said level, and, in the presence of a variable flow of polluted water through said casing, variably pressurizing a headspace maintained in said casing above said polluted water therein, preventing said polluted water from overflowing said upper edges of said panels while maintaining said polluted water at a level which is adjacent said upper edges; and (e) while conducting steps (b)–(d), brushing radially inner and outer surfaces of said panels using arms depending from above said panels into cleaning relationship therewith and rotated coaxially with said panels, for removing accumulating material from said surfaces.

* * * * *